United States Patent
Zhou et al.

(10) Patent No.: US 10,411,503 B2
(45) Date of Patent: Sep. 10, 2019

(54) MOTOR TRAIN UNIT AUXILIARY POWER SUPPLY APPARATUS

(71) Applicant: CRRC QINGDAO SIFANG CO., LTD., Qingdao, Shandong (CN)

(72) Inventors: Jiansheng Zhou, Shangdong (CN); Jinghai Jiao, Shangdong (CN); Yanzun Yu, Shandong (CN); Buzhao Niu, Shandong (CN); Fujie Jiang, Shandong (CN); Donghua Wu, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 16/073,735

(22) PCT Filed: Nov. 17, 2016

(86) PCT No.: PCT/CN2016/106219
§ 371 (c)(1),
(2) Date: Jul. 27, 2018

(87) PCT Pub. No.: WO2017/152652
PCT Pub. Date: Sep. 14, 2017

(65) Prior Publication Data
US 2019/0013695 A1  Jan. 10, 2019

(30) Foreign Application Priority Data

Mar. 9, 2016 (CN) .......................... 2016 1 0133925

(51) Int. Cl.
*H02J 9/06* (2006.01)
*B60L 1/00* (2006.01)
(Continued)

(52) U.S. Cl.
CPC .............. *H02J 9/061* (2013.01); *B60L 1/003* (2013.01); *H02J 3/006* (2013.01); *H02J 3/04* (2013.01);
(Continued)

(58) Field of Classification Search
None
See application file for complete search history.

(56) References Cited

U.S. PATENT DOCUMENTS 2,331,223 A    10/1943  Parsons
6,304,006 B1 * 10/2001  Jungreis .................... H02J 3/38
                                                                307/64

(Continued)

FOREIGN PATENT DOCUMENTS

CN    103368251 A   10/2013
CN    203697972 U    7/2014
(Continued)

OTHER PUBLICATIONS

The European search report dated Apr. 16, 2019 for European Application No. 16893295.2.
(Continued)

*Primary Examiner* — Jared Fureman
*Assistant Examiner* — Aqeel H Bukhari
(74) *Attorney, Agent, or Firm* — Yue (Robert) Xu; Apex Attorneys at Law, LLP

(57) ABSTRACT

An auxiliary power supply device for a multiple-unit train is provided. A normally-open main contact of a three-phase isolation contactor is connected in series between a three-phase four-wire bus of a first unit and a three-phase four-wire bus of a second unit, and a coil of the three-phase isolation contactor is connected in series in a power supply circuit of the first unit and a power supply circuit of the second unit; a control circuit of the first unit controls the
(Continued)

power supply circuit of the first unit to be energized when the three-phase four-wire bus of the first unit supplies power, to close the normally-open main contact; and the control circuit of the second unit controls the power supply circuit of the second unit to be energized when the three-phase four-wire bus of the second unit supplies power to close the normally-open main contact.

8 Claims, 2 Drawing Sheets

(51) Int. Cl.
  *H02J 9/00* (2006.01)
  *H02J 3/00* (2006.01)
  *H02J 3/04* (2006.01)
(52) U.S. Cl.
  CPC *H02J 9/00* (2013.01); *H02J 9/06* (2013.01); *B60L 2200/26* (2013.01); *H02J 2009/068* (2013.01)

(56) References Cited

U.S. PATENT DOCUMENTS

2011/0256973 A1* 10/2011 Werner ............... B60K 6/365
  475/5
2013/0240678 A1* 9/2013 Frazier ............... B61C 3/00
  246/186

FOREIGN PATENT DOCUMENTS

| | | |
|---|---|---|
| CN | 204506572 U | 7/2015 |
| CN | 104932311 A | 9/2015 |
| CN | 204998355 U | 1/2016 |
| CN | 105790419 A | 7/2016 |
| CN | 205657487 U | 10/2016 |
| JP | 2008271739 A | 11/2008 |
| JP | 2009005479 A | 1/2009 |

OTHER PUBLICATIONS

International Search Report for PCT/CN2016/106219, dated Feb. 9, 2017, ISA/CN.

* cited by examiner

MOTOR TRAIN UNIT AUXILIARY POWER SUPPLY APPARATUS

This application is the national phase of International Application No. PCT/CN2016/106219, titled "MOTOR TRAIN UNIT AUXILIARY POWER SUPPLY APPARATUS", filed on Nov. 17, 2016, which claims the priority to Chinese Patent Application No. 201610133925.2, titled "MOTOR TRAIN UNIT AUXILIARY POWER SUPPLY APPARATUS", filed with the Chinese State Intellectual Property Office on Mar. 9, 2016, which are incorporated herein by reference in their entireties.

FIELD

The present disclosure relates to the technical field of train power supply, and particularly to an auxiliary power supply device for a multiple-unit train.

BACKGROUND

A standard multiple-unit train in China includes eight compartments, where compartments 1 to 4 constitute a first unit, and compartments 5 to 8 constitute a second unit. Two ends of the train are provided with two cabs, respectively. When the train travels, only one cab is activated, that is, the cab of the first unit is activated to control the train to travel, or the cab of the second unit is activated to control the train to travel.

For example, in a case that the cab of the first unit is used, the cab of the first unit controls the train to travel. The driver operates a pantograph, such that the pantograph rises up to contact with an overhead contact line, by which the train is powered.

For the multiple unit, in addition to supplying power to the train to draw the train to travel, the overhead contact line supplies power to auxiliary equipment in the train. The auxiliary equipment includes, for example, an auxiliary fan of a traction system, an air conditioner, an air compressor and other electric equipment.

However, in a case that a three-phase bus ground fault occurs when the train travels, an auxiliary power supply system fails. In this case, the train traction equipment, the air conditioner and the air compressor cannot operate normally, and the train is out of service.

Therefore, it is necessary for those skilled in the art to provide an auxiliary power supply device for a multiple-unit train, to facilitate normal power supply of the train.

SUMMARY

In order to solve the technical issue in the conventional technology, an auxiliary power supply device for a multiple-unit train is provided according to the present disclosure, to facilitate normal power supply of the train.

An auxiliary power supply device for a multiple-unit train is provided according to the present disclosure, which includes: a three-phase isolation contactor, an alternating current relay of a first unit, an alternating current relay of a second unit, a control circuit of the first unit, a control circuit of the second unit, a power supply circuit of the first unit, and a power supply circuit of the second unit, where the three-phase isolation contactor includes a normally-open main contact of the three-phase isolation contactor and a coil of the three-phase isolation contactor, the normally-open main contact of the three-phase isolation contactor is connected in series between a three-phase four-wire bus of the first unit and a three-phase four-wire bus of the second unit, and the coil of the three-phase isolation contactor is connected in series between the power supply circuit of the first unit and the power supply circuit of the second unit;

two terminals of a coil of the alternating current relay of the first unit are respectively connected to one phase and a neutral line of the bus of the first unit, and two terminals of a coil of the alternating current relay of the second unit are respectively connected to one phase and a neutral line of the bus of the second unit;

the control circuit of the first unit is configured to control the power supply circuit of the first unit to be energized when the three-phase four-wire bus of the first unit supplies power, to power on the coil of the three-phase isolation contactor and close the normally-open main contact of the three-phase isolation contactor; and the control circuit of the second unit is configured to control the power supply circuit of the second unit to be energized when the three-phase four-wire bus of the second unit supplies power, to power on the coil of the three-phase isolation contactor and close the normally-open main contact of the three-phase isolation contactor.

Preferably, the control circuit of the first unit may include a first normally-open contact of the alternating current relay of the first unit, a normally-closed contact of the alternating current relay of the second unit, a second normally-open contact of an auxiliary relay, a coil of the auxiliary relay and a second normally-open contact of the alternating current relay of the first unit, where a stationary contact of the second normally-open contact of the alternating current relay of the first unit is connected to the neutral line of the first unit, and a moving contact of the second normally-open contact of the alternating current relay of the first unit is connected to a first node;

a first terminal of the coil of the auxiliary relay is connected to the first node, and a second terminal of the coil of the auxiliary relay is connected to one phase of the bus of the first unit through the first normally-open contact of the alternating current relay of the first unit and the normally-closed contact of the alternating current relay of the second unit which are connected in series; and the second normally-open contact of the auxiliary relay is connected in parallel to two terminals of the normally-closed contact of the alternating current relay of the second unit.

Preferably, the power supply circuit of the first unit may include the coil of the three-phase isolation contactor, a third normally-open contact of the alternating current relay of the first unit and a first normally-open contact of the auxiliary relay, where a first terminal of the coil of the three-phase isolation contactor is connected to the first node; and a second terminal of the coil of the three-phase isolation contactor is connected to one phase of the bus of the first unit through the third normally-open contact of the alternating current relay of the first unit and the first normally-open contact of the auxiliary relay which are connected in series.

Preferably, the control circuit of the second unit may include: a first normally-open contact of the alternating current relay of the second unit, a normally-closed contact of the alternating current relay of the first unit, a fourth normally-open contact of the auxiliary relay, the coil of the auxiliary relay and a second normally-open contact of the alternating current relay of the second unit, where a stationary contact of the second normally-open contact of the alternating current relay of the second unit is connected to the neutral line of the second unit, and a moving contact of the second normally-open contact of the alternating current relay of the second unit is connected to the first node;

the second terminal of the coil of the auxiliary relay is connected to one phase of the bus of the second unit through the first normally-open contact of the alternating current relay of the second unit and the normally-closed contact of the alternating current relay of the first unit which are connected in series; and the fourth normally-open contact of the auxiliary relay is connected in parallel to two terminals of the normally-closed contact of the alternating current relay of the first unit.

Preferably, the power supply circuit of the second unit may include the coil of the three-phase isolation contactor, a third normally-open contact of the alternating current relay of the second unit and a third normally-open contact of the auxiliary relay, where a second terminal of the coil of the three-phase isolation contactor is connected to one phase of the bus of the second unit through the third normally-open contact of the alternating current relay of the second unit and the third normally-open contact of the auxiliary relay which are connected in series.

Preferably, a first isolation circuit breaker may be connected in series in the control circuit of the first unit; and a second isolation circuit breaker is connected in series in the control circuit of the second unit.

Preferably, an isolation alternating current contactor cutoff/reset relay may be connected in series in each of the control circuit of the first unit and the control circuit of the second unit.

Preferably, an emergency traction state relay may be connected in series in each of the control circuit of the first unit and the control circuit of the second unit.

As compared with the conventional technology, the present disclosure has at least the following advantages.

In the auxiliary power supply device for a multiple-unit train according to the present disclosure, the first control unit may control the first power supply circuit to be conductive when the three-phase four-wire bus of the first unit is powered, to power on the coil of the three-phase isolation contactor and close the three-phase isolation contactor, such that the power supplied to the first unit is simultaneously supplied to the second unit, thereby supplying power to the entire train. Similarly, the second control unit may control the first power supply circuit to be conductive when the three-phase four-wire bus of the second unit is powered, to power on the coil of the three-phase isolation contactor and close the three-phase isolation contactor, such that the power supplied to the second unit is simultaneously supplied to the first unit, thereby supplying power to the whole train.

BRIEF DESCRIPTION OF THE DRAWINGS

The drawings to be used in the description of the embodiments or the conventional technology will be described briefly hereafter, such that the technical solutions according to the embodiments of the present disclosure or in the conventional technology will become clearer. It is apparent that the drawings in the following description only illustrate some embodiments of the present disclosure. For those skilled in the art, other drawings may be obtained based on the provided drawings without any creative work.

DETAILED DESCRIPTION OF THE EMBODIMENTS

Figure 1:
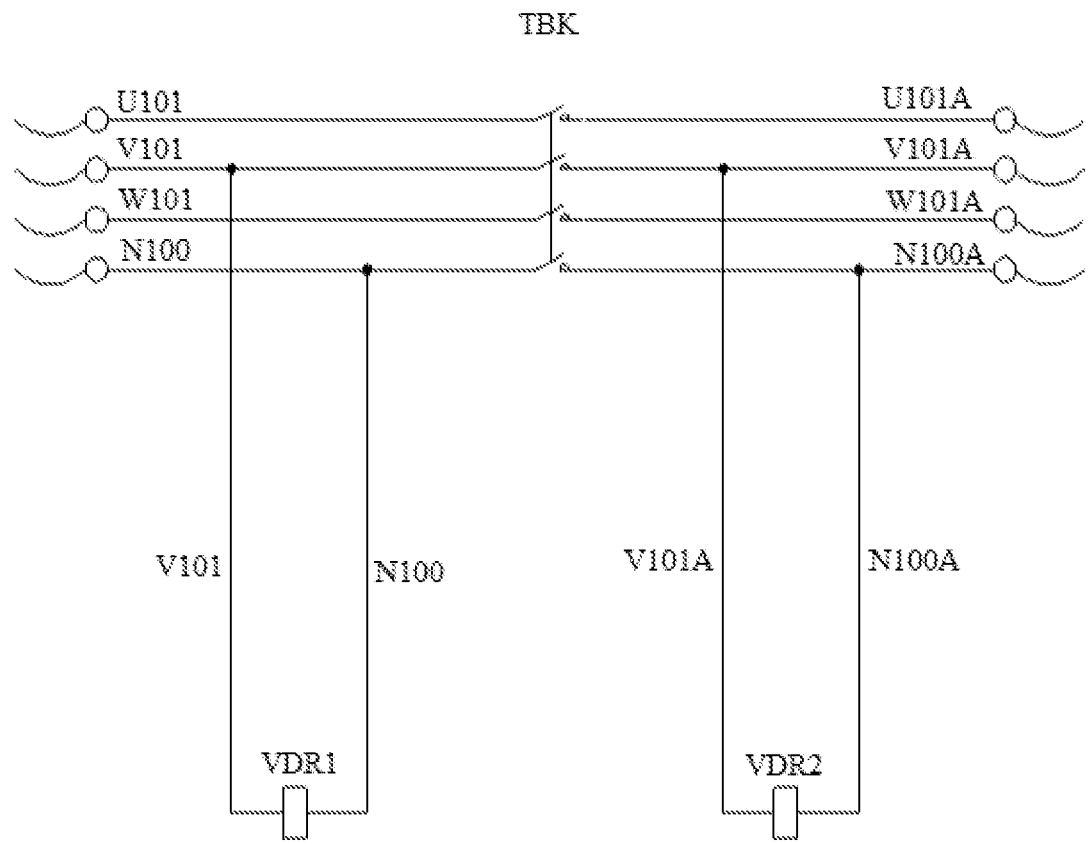
FIG. 1 is a schematic diagram of a control relay power supply circuit according to the present disclosure.

The technical solution according to the embodiments of the present disclosure is described clearly and completely as follows in conjunction with the accompanying drawings in the embodiments of the present disclosure, for those skilled in the art to better understand the technical solution of the present disclosure. It is apparent that the described embodiments are only a few rather than all of the embodiments of the present disclosure. Any other embodiment obtained by those skilled in the art based on the embodiments of the present disclosure without any creative work falls in the protection scope of the present disclosure.

An auxiliary power supply device for a multiple-unit train is provided according to the present disclosure, which includes a three-phase isolation contactor, an alternating current relay of a first unit, an alternating current relay of a second unit, a control circuit of the first unit, a control circuit of the second unit, a power supply circuit of the first unit and a power supply circuit of the second unit.

The three-phase isolation contactor includes a normally-open main contact of the three-phase isolation contactor and a coil of the three-phase isolation contactor. The normally-open main contact of the three-phase isolation contactor is connected in series between a three-phase four-wire bus of a first unit and a three-phase four-wire bus of a second unit. The coil of the three-phase isolation contactor is connected in series in each of the power supply circuit of the first unit and the power supply circuit of the second unit.

Two terminals of a coil of the alternating current relay of the first unit are respectively connected to one phase and a neutral line of the bus of the first unit. Two terminals of a coil of the alternating current relay of the second unit are respectively connected to one phase and a neutral line of the bus of the second unit.

The control circuit of the first unit is configured to control the power supply circuit of the first unit to be energized when power is supplied by the three-phase four-wire bus of the first unit, to power on the coil of the three-phase isolation contactor and close the normally-open main contact of the three-phase isolation contactor.

The control circuit of the second unit is configured to control the power supply circuit of the second unit to be energized when power is supplied by the three-phase four-wire bus of second unit, to power on the coil of the three-phase isolation contactor and close the normally-open main contact of the three-phase isolation contactor.

It should be understood that, the first control unit may control the first power supply circuit to be conductive when the three-phase four-wire bus of the first unit is powered, to power on the coil of the three-phase isolation contactor and close the three-phase isolation contactor, such that the power supplied to the first unit is simultaneously supplied to the second unit, thereby supplying power to the entire train. Similarly, the second control unit may control the first power supply circuit to be conductive when the three-phase four-wire bus of the second unit is powered, to power on the coil of the three-phase isolation contactor and close the three-phase isolation contactor, such that the power supplied to the second unit is simultaneously supplied to the first unit, thereby supplying power to the whole train.

The implementation of the present disclosure is described below in detail in conjunction with FIG. 1 and FIG. 2.

Reference is made to FIG. 1, which is a schematic diagram of a control relay power supply circuit according to the present disclosure.

A power supply device according to the present disclosure is a three-phase four-wire power supply device, which includes three phases of bus U, V and W, and a neutral line N. The three phases and four wires of the first unit include U101, V101, W101 and N100, and the three phases and four wires of a second unit include U101A, V101A, W101A and N100A.

A three-phase isolation contactor TBK is connected in series between the bus of the first unit and the bus of the second unit.

VDR1 and VDR2 are the alternating current relay of the first unit and the alternating current relay of the second unit, respectively. It should be understood that a coil of each of the relays is represented by the same reference numeral as a corresponding contact in the present disclosure. For example, the coil and the contact of the alternating current relay of the first unit are all represented by the reference numeral VDR1.

As can be seen from FIG. 1, two terminals of the coil of VDR1 are connected to V101 and N100 respectively, and two terminals of the coil of VDR2 are connected to V101A and N100A respectively. As can be seen, the coils of VDR1 and VDR2 are directly powered through the three-phase alternating current bus, where a supply voltage is AC 220V and a frequency is 50 Hz.

When an auxiliary power supply of the first unit is activated, the coil of VDR1 is powered on. When an auxiliary power supply of the second unit is activated, the coil of VDR2 is powered on.

An object of the present disclosure is as follows. The contact of the three-phase isolation contactor TBK in FIG. 1 is closed when the first unit is powered, that is, the power supplied to the first unit can be simultaneously supplied to the three-phase bus of the second unit. Similarly, the contact of the three-phase isolation contactor TBK in FIG. 1 is closed when the second unit is powered, that is, the power supplied to the second unit can be simultaneously supplied to the three-phase bus of the first unit. In this way, when either unit of the train is powered, the entire train can be powered, that is, all compartments of the train are powered.

An excitation and self-holding control circuit for TBK according to the present disclosure is described below in conjunction with FIG. 2.

Figure 2:
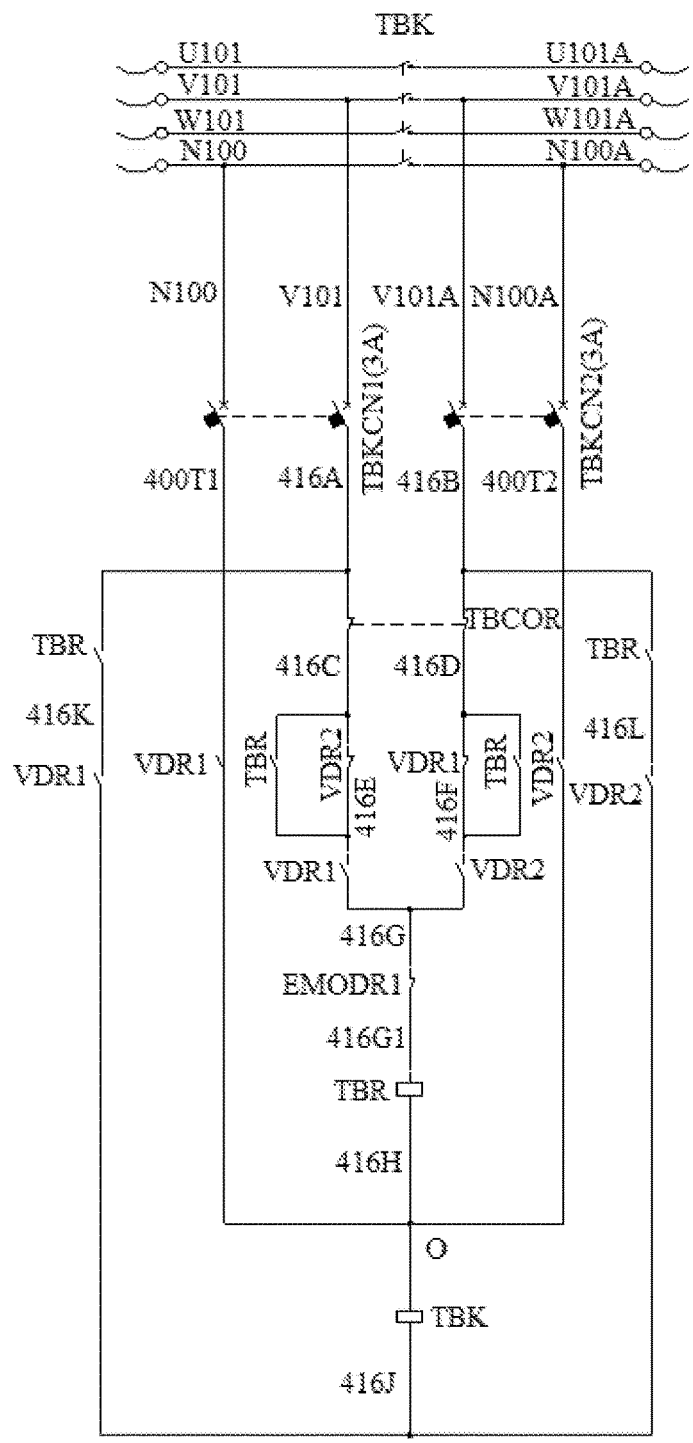
FIG. 2 shows an excitation and self-holding control circuit for TBK according to the present disclosure.

A control circuit for powering the coil of the three-phase isolation contactor and holding the power of the coil of the three-phase isolation contactor in FIG. 1 is described in conjunction with FIG. 2. Only when the coil of the three-phase isolation contactor is powered on, the normally-open contact of the three-phase isolation contactor is closed, that is, the normally-open contact of TBK in FIG. 1 is closed, such that the entire train is powered when the unit on one side is powered.

The control circuit of the first unit includes a first normally-open contact VDR1 of the alternating current relay of the first unit, a normally-closed contact VDR2 of the alternating current relay of the second unit, a second normally-open contact TBR of an auxiliary relay, a coil TBR of the auxiliary relay and a second normally-open contact VDR1 of the alternating current relay of the first unit.

It should be noted that the alternating current relay of the first unit includes three normally-open contacts, which are all denoted as VDR1, and the coil and a normally-closed contact of the alternating current relay of the first unit are also denoted as VDR1. When the coil of the alternating current relay of the first unit is powered on or powered off, all corresponding contacts take action.

A stationary contact of the second normally-open contact VDR1 of the alternating current relay of the first unit is connected to the neutral line N100 of the first unit, and a moving contact of the second normally-open contact VDR1 of the alternating current relay of the first unit is connected to a first node O.

A first terminal of the coil TBR of the auxiliary relay is connected to the first node O, a second terminal of the coil TBR of the auxiliary relay is connected to one phase of the bus V101 of the first unit through the first normally-open contact VDR1 of the alternating current relay of the first unit and the normally-closed contact VDR2 of the alternating current relay of the second unit which are connected in series.

The second normally-open contact TBR of the auxiliary relay is connected in parallel to two terminals of the normally-closed contact VDR2 of the alternating current relay of the second unit. It should be understood that, when the coil TBR of the auxiliary relay is powered on, the second normally-open contact TBR of the auxiliary relay is closed, such that the normally-closed contact VDR2 of the alternating current relay of the second unit is short-circuited.

The power supply circuit of the first unit includes the coil TBK of the three-phase isolation contactor, a third normally-open contact VDR1 of the alternating current relay of the first unit and a first normally-open contact TBR of the auxiliary relay.

A first terminal of the coil TBK of the three-phase isolation contactor is connected to the first node O.

A second terminal of the coil TBK of the three-phase isolation contactor is connected to the one phase of the bus V101 of the first unit through the third normally-open contact VDR1 of the alternating current relay of the first unit and the first normally-open contact TBR of the auxiliary relay which are connected in series.

The control circuit of the second unit includes a first normally-open contact VDR2 of the alternating current relay of the second unit, a normally-closed contact VDR1 of the alternating current relay of the first unit, a fourth normally-open contact TBR of the auxiliary relay, the coil TBR of the auxiliary relay and a second normally-open contact VDR2 of the alternating current relay of the second unit.

A stationary contact of the second normally-open contact VDR2 of the alternating current relay of the second unit is connected to the neutral line N100A of the second unit, and a moving contact of the second normally-open contact VDR2 of the alternating current relay of the second unit is connected to the first node O.

The second terminal of the coil TBR of the auxiliary relay is connected to one phase of the bus V101A of the second unit through the first normally-open contact VDR2 of the alternating current relay of the second unit and the normally-closed contact VDR1 of the alternating current relay of the first unit which are connected in series.

The fourth normally-open contact TBR of the auxiliary relay is connected in parallel to two terminals of the normally-closed contact VDR1 of the alternating current relay of the first unit.

The power supply circuit of the second unit includes the coil TBK of the three-phase isolation contactor, a third normally-open contact VDR2 of the alternating current relay of the second unit and a third normally-open contact TBR of the auxiliary relay.

A second terminal of the coil TBK of the three-phase isolation contactor is connected to one phase of the bus of the second unit through the third normally-open contact VDR2 of the alternating current relay of the second unit and the third normally-open contact TBR of the auxiliary relay which are connected in series.

It should be noted that the control circuit of the first unit and the control circuit of the second unit share a common part. For example, the coil TBR is located in both the control circuit of the first unit and the control circuit of the second unit. The power supply circuit of the first unit and the power supply circuit of the second unit share a common part. For example, the coil TBK is located in both the power supply circuit of the first unit and the power supply circuit of the second unit.

For example, when the three-phase bus on the side of the first unit supplies power, the normally-closed contact of VDR2 is closed since the coil of VRD2 is not powered on, but the coil of VDR1 is powered on, and all the normally-open contacts corresponding to VDR1 are closed. That is, a path of the control circuit in FIG. 2 is V101→416A→416C→the normally-closed contact of VDR2→416E→the first normally-open contact of VDR1→416G→the coil of the auxiliary relay TBR→the second normally-open contact of VDR1→N100.

In this case, since the coil of the auxiliary relay TBR is powered on, the first normally-open contact of the auxiliary relay TBR is closed. Since the first normally-open contact of TBR, the third normally-open contact of VDR1 and the coil of TBK are connected in series in the power supply circuit, when both of the first normally-open contact of TBR and the third normally-open contact of VDR1 are closed, the power supply circuit is energized, and the coil of TBK is powered on, such that the contact of TBK in FIG. 1 is powered on, that is, the three-phase bus of the first unit is connected to the three-phase bus of the second unit, thus the entire train is powered.

It should be noted that the relay TBR serves as an intermediate relay, and the contact of the intermediate relay functions to power on the coil of TBK. The control circuit of TBK is isolated from the power supply circuit through the intermediate relay in the following manner: the coil of TBR is powered on only in a case that all determination conditions are met, the first normally-open contact TBR of the auxiliary relay is connected in series to the coil of TBK on the upstream side of the coil of TBK in the power supply loop for the coil of TBK, and the third normally-open contact TBR of the auxiliary relay is connected in series to the coil of TBK on the upstream side of the coil of TBK in the power supply loop for the coil of TBK, such that the power supply circuit can withstand the coil of TBK with great power. If there is no TBR serving as the intermediate relay, the entire TBK control circuit may be subjected to a great current, and contacts of relays VDR1, VDR2, TBCOR and EMODR1 for controlling are prone to sticking failure if they are subjected to a great current for a long duration. A TBR with suitably selected parameters can effectively improve the reliability of the circuit.

In addition, the second normally-open contact of TBR is connected in parallel to two terminals of the normally-closed contact of VDR2. When the coil of TBR is powered on, the second normally-open contact of TBR is closed. In this case, when the contact of TBK is closed, the coil of VDR2 is powered on and the normally-closed contact of VDR2 is opened. Therefore, self-holding power supply is achieved by closing of the second normally-open contact of TBR.

Since the power supply circuit and the control circuit of the first unit are symmetrical to the power supply circuit and the control circuit of the second unit, respectively, the operation principle and the connection relationship of the power supply circuit and the control circuit of the first unit are the same as that of the power supply circuit and the control circuit of the second unit, as shown in FIG. 2.

Similarly, when the three-phase bus of the second unit supplies power, the contact of TBK may be closed through the control circuit and the power supply circuit corresponding to the second unit, such that power supplied to the second unit is simultaneously supplied to the three-phase bus of the first unit, thereby supplying power to the entire train.

This case is described below in detail in conjunction with FIG. 2.

When the coil of VDR2 is powered on, all the normally-open contacts of VDR2 are closed. Three normally-open contacts of relay VDR2 are shown in FIG. 2, and the three normally-open contacts take action simultaneously.

When V101A and N100A supply power, the normally-closed contact of VDR1 is closed since the coil of VRD1 is not powered on. In this case, the first normally-open contact of VDR2 is closed, the coil of TBR is powered on, and the control circuit of the second unit is energized. A path of the control circuit of the second unit is V101A→416B→416D→the normally-closed contact of VDR1→416F→the first normally-open contact of VDR2→the coil of TBR→the second normally-open contact of VDR2→N100A.

In this case, since the coil of TBR is powered on, the third normally-closed contact of TBR and the fourth normally-closed contact of TBR are closed, and the power supply circuit is conductive. A path of the power supply circuit of the second unit is: the third normally-open contact of TBR→the third normally-open contact of VDR2→416J→the coil of TBK→the second normally-open contact of VDR2→N100A.

The coil of TBK is powered on, such that the normally-open contact of TBK in FIG. 1 is closed, and power supplied to the second unit is simultaneously supplied to the first unit, thus the entire train is powered.

Similarly, when the coil of VDR1 is powered on, the normally-closed contact of VDR1 is opened, a path is provided through the fourth normally-open contact of TBR, thereby achieving self-holding power supply.

Further, the power supply circuit of the first unit includes the third normally-open contact of VDR1 and the first normally-open contact of TBR which are connected in series, such that the power supply circuit of the first unit may be cut off when a power supply failure occurs in the first unit, thereby preventing the power supplied to the second unit from being reversely fed to the power supply circuit of the first unit. For example, when VDR1 of the first unit fails, a circuit breaker TBKCN1 is opened for protecting the relay and the power supply circuit. If normally-open contacts of VDR1 and VDR2 are not provided, when TBR is powered on, the normally-open contacts are closed, and power supplied through TBKCN2 is connected to the downstream side of the circuit breaker TBKCN1 through the normally-open contact of TBR, which results in the opened circuit breaker TBKCN1 being electrified.

Further, in the present disclosure, the normally-closed contact of VDR2 is connected in series in the control circuit of the first unit, and the normally-closed contact of VDR1 is connected in series in the control circuit of the second unit, thereby achieving interlocking protection logic. In a case that the first unit and the second unit are powered simultaneously, a voltage and a phase sequence of the three-phase bus for powering the first unit are not necessarily the same as those of the three-phase bus for powering the second unit, and auxiliary electric equipment may be burned if TBK is closed blindly. Therefore, the circuit of TBK is blocked when the first unit and the second unit are powered simultaneously. The normally-closed contacts of VRD1 and VDR2 are opened simultaneously, such that TBK cannot be closed, thereby effectively protecting the auxiliary electric equipment.

Further, it is to be noted that the first isolation circuit breaker TBKCN1 and the second isolation circuit breaker TBKCN2 in FIG. 2 are closed in normal cases. An isolation alternating current contactor cut-off/reset relay TBCOR is also closed in normal cases. An emergency traction state relay EMODR1 is also closed in normal cases. Therefore, TBKCN1, TBKCN2, TBCOR and EMODR1 can be connected in series in the control circuit.

When the first unit is powered, the following conditions are to be met.

VDR1 is powered on; no isolation alternating current contactor cut-off instruction is outputted by the train, that is, the relay TBCOR is not excited; the circuit breaker TBKCN1 is closed; and the train is not in an emergency traction state, that is, the relay EMODR1 is not excited.

When the second unit is powered, the following conditions are to be met.

VDR2 is powered on; no isolation alternating current contactor cut-off instruction is outputted by the train, that is, the relay TBCOR is not excited; the circuit breaker TBKCN2 is closed; and the train is not in an emergency traction state, that is, the relay EMODR1 is not excited.

What is described above is only preferred embodiments of the present disclosure and is not intended to limit the present disclosure in any way. The preferred embodiments of the present disclosure are disclosed above, which should not be interpreted as limiting the present disclosure. Numerous alternations, modifications, and equivalents can be made to the technical solutions of the present disclosure by those skilled in the art in light of the methods and technical content disclosed herein without deviation from the scope of the present disclosure. Therefore, any alternations, modifications, and equivalents made to the embodiments above according to the technical essential of the present disclosure without deviation from the scope of the present disclosure should fall within the scope of protection of the present disclosure.

The invention claimed is:

1. An auxiliary power supply device for a multiple-unit train, comprising:
a three-phase isolation contactor,
an alternating current relay of a first unit,
an alternating current relay of a second unit,
a control circuit of the first unit,
a control circuit of the second unit,
a power supply circuit of the first unit, and
a power supply circuit of the second unit, wherein
the three-phase isolation contactor comprises a normally-open main contact of the three-phase isolation contactor and a coil of the three-phase isolation contactor, the normally-open main contact of the three-phase isolation contactor is connected in series between a three-phase four-wire bus of the first unit and a three-phase four-wire bus of the second unit, and the coil of the three-phase isolation contactor is connected in series in each of the power supply circuit of the first unit and the power supply circuit of the second unit;
two terminals of a coil of the alternating current relay of the first unit are respectively connected to one phase and a neutral line of the bus of the first unit, and two terminals of a coil of the alternating current relay of the second unit are respectively connected to one phase and a neutral line of the bus of the second unit;
the control circuit of the first unit is configured to control the f power supply circuit of the first unit to be energized when the three-phase four-wire bus of the first unit supplies power, to power on the coil of the three-phase isolation contactor and close the normally-open main contact of the three-phase isolation contactor; and
the control circuit of the second unit is configured to control the power supply circuit of the second unit to be energized when the three-phase four-wire bus of the second unit supplies power, to power on the coil of the three-phase isolation contactor and close the normally-open main contact of the three-phase isolation contactor.

2. The auxiliary power supply device for a multiple-unit train according to claim 1, wherein the control circuit of the first unit comprises a first normally-open contact of the alternating current relay of the first unit, a normally-closed contact of the alternating current relay of the second unit, a second normally-open contact of an auxiliary relay, a coil of the auxiliary relay and a second normally-open contact of the alternating current relay of the first unit, wherein
a stationary contact of the second normally-open contact of the alternating current relay of the first unit is connected to the neutral line of the first unit, and a moving contact of the second normally-open contact of the alternating current relay of the first unit is connected to a first node;
a first terminal of the coil of the auxiliary relay is connected to the first node, and a second terminal of the coil of the auxiliary relay is connected to one phase of the bus of the first unit through the first normally-open contact of the alternating current relay of the first unit and the normally-closed contact of the alternating current relay of the second unit which are connected in series; and
the second normally-open contact of the auxiliary relay is connected in parallel to two terminals of the normally-closed contact of the alternating current relay of the second unit.

3. The auxiliary power supply device for a multiple-unit train according to claim 2, wherein the power supply circuit of the first unit comprises the coil of the three-phase isolation contactor, a third normally-open contact of the alternating current relay of the first unit and a first normally-open contact of the auxiliary relay, wherein
a first terminal of the coil of the three-phase isolation contactor is connected to the first node; and
a second terminal of the coil of the three-phase isolation contactor is connected to one phase of the bus of the first unit through the third normally-open contact of the alternating current relay of the first unit and the first normally-open contact of the auxiliary relay which are connected in series.

4. The auxiliary power supply device for a multiple-unit train according to claim 2, wherein the control circuit of the second unit comprises: a first normally-open contact of the alternating current relay of the second unit, a normally-closed contact of the alternating current relay of the first unit, a fourth normally-open contact of the auxiliary relay, the coil of the auxiliary relay and a second normally-open contact of the alternating current relay of the second unit, wherein a stationary contact of the second normally-open contact of the alternating current relay of the second unit is connected to the neutral line of the second unit, and a moving contact of the second normally-open contact of the alternating current relay of the second unit is connected to the first node;

the second terminal of the coil of the auxiliary relay is connected to one phase of the bus of the second unit through the first normally-open contact of the alternating current relay of the second unit and the normally-closed contact of the alternating current relay of the first unit which are connected in series; and the fourth normally-open contact of the auxiliary relay is connected in parallel to two terminals of the normally-closed contact of the alternating current relay of the first unit.

5. The auxiliary power supply device for a multiple-unit train according to claim 2, wherein the power supply circuit of the second unit comprises the coil of the three-phase isolation contactor, a third normally-open contact of the alternating current relay of the second unit and a third normally-open contact of the auxiliary relay, wherein a second terminal of the coil of the three-phase isolation contactor is connected to one phase of the bus of the second unit through the third normally-open contact of the alternating current relay of the second unit and the third normally-open contact of the auxiliary relay which are connected in series.

6. The auxiliary power supply device for a multiple-unit train according to claim 1, wherein a first isolation circuit breaker is connected in series in the control circuit of the first unit; and a second isolation circuit breaker is connected in series in the control circuit of the second unit.

7. The auxiliary power supply device for a multiple-unit train according to claim 1, wherein an isolation alternating current contactor cut-off/reset relay is connected in series in each of the control circuit of the first unit and the control circuit of the second unit.

8. The auxiliary power supply device for a multiple-unit train according to claim 1, wherein an emergency traction state relay is connected in series in each of the control circuit of the first unit and the control circuit of the second unit.

* * * * *